United States Patent
Zhang et al.

(10) Patent No.: US 11,507,856 B2
(45) Date of Patent: Nov. 22, 2022

(54) METHOD AND APPARATUS FOR UPDATING APPLICATION

(71) Applicant: BEIJING BAIDU NETCOM SCIENCE AND TECHNOLOGY CO., LTD., Beijing (CN)

(72) Inventors: Runqi Zhang, Beijing (CN); Qin Li, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 747 days.

(21) Appl. No.: 16/511,547

(22) Filed: Jul. 15, 2019

(65) Prior Publication Data

US 2020/0019868 A1  Jan. 16, 2020

(30) Foreign Application Priority Data

Jul. 16, 2018  (CN) .......................... 201810778200.8

(51) Int. Cl.
*G06N 5/04* (2006.01)
*G06F 8/656* (2018.01)
(Continued)

(52) U.S. Cl.
CPC .................. *G06N 5/04* (2013.01); *G06F 8/65* (2013.01); *G06F 8/656* (2018.02); *G06K 9/6215* (2013.01)

(58) Field of Classification Search
CPC ......... G06F 8/65; G06F 8/656; G06F 8/60–78
(Continued)

(56) References Cited

U.S. PATENT DOCUMENTS 9,904,536 B1 * 2/2018 Qian .......................... G06F 8/65
2015/0378714 A1 * 12/2015 Katariya ................. H04L 67/34
717/170
(Continued)

FOREIGN PATENT DOCUMENTS

CN       105549973 A    5/2016
CN       107463400 A   12/2017
(Continued)

OTHER PUBLICATIONS

Lawton, George. "Developing software online with platform-as-a-service technology." Computer 41.6 (2008): pp. 13-15. (Year: 2008).*

(Continued)

*Primary Examiner* — Satish Rampuria
(74) *Attorney, Agent, or Firm* — Fay Sharpe LLP

(57) ABSTRACT

A method for updating an application is provided. In the method, a first interface image generated during a period that a first instance of the application is running is obtained. The first instance of the application is running on an application trial platform. The application trial platform is communicatively couplable to a server of the application. A plurality of attributes associated with a control contained in the first interface image are extracted. Based on the plurality of attributes, it is determined whether the first interface image indicates that an update of the application is released by the server. In response to determining that the first interface image indicates that the update of the application is released by the server, the first instance of the application is updated on the application trial platform.

18 Claims, 7 Drawing Sheets

(51) Int. Cl.
*G06K 9/62* (2022.01)
*G06F 8/65* (2018.01)

(58) Field of Classification Search
USPC .................................................. 717/124–178
See application file for complete search history.

(56) References Cited

U.S. PATENT DOCUMENTS

| | | | | |
|---|---|---|---|---|
| 2016/0070578 | A1* | 3/2016 | Fan | G06F 8/658 717/170 |
| 2016/0321585 | A1* | 11/2016 | Saraswat | G06Q 10/06311 |
| 2018/0034688 | A1* | 2/2018 | Lee | H04L 41/0803 |
| 2020/0219004 | A1* | 7/2020 | Daly | G06N 5/045 |
| 2021/0133555 | A1* | 5/2021 | Qiu | G06N 3/0454 |
| 2022/0138887 | A1* | 5/2022 | Shang | G06Q 30/0207 705/14.1 |

FOREIGN PATENT DOCUMENTS

| | | |
|---|---|---|
| JP | 2002006970 A | 1/2002 |
| JP | 2015225628 A1 | 12/2015 |
| JP | 2016532986 A | 10/2016 |
| KR | 1020150005667 A | 1/2015 |
| KR | 1020150110766 A | 10/2015 |

OTHER PUBLICATIONS

Chen, Haibo, et al. "Live updating operating systems using virtualization." Proceedings of the 2nd international conference on Virtual execution environments. 2006.pp. 35-44 (Year: 2006).*

Marin-Perianu, Mihai, et al. "Decentralized enterprise systems: a multiplatform wireless sensor network approach." IEEE Wireless Communications 14.6 (2007): pp. 57-66. (Year: 2007).*

Aher, Sunita B., and L. M. R. J. Lobo. "Combination of machine learning algorithms for recommendation of courses in E-Learning System based on historical data." Knowledge-Based Systems 51 (2013): pp. 1-14. (Year: 2013).*

Galindo, Jorge, and Pablo Tamayo. "Credit risk assessment using statistical and machine learning: basic methodology and risk modeling applications." Computational economics 15.1 (2000): pp. 107-143. (Year: 2000).*

Nguyen, Thuy TT, and Grenville Armitage. "A survey of techniques for internet traffic classification using machine learning." IEEE communications surveys & tutorials 10.4 (2008): pp. 56-76. (Year: 2008).*

Office Action for Korean Application No. 1020190080783, dated May 20, 2020, 11 pages.

Office Action for Japanese Application No. 2109131031, dated Jul. 21, 2020, 4 papes.

Office Action for Chinese Application No. 201810778200.8, dated Jul. 13, 2021, 6 pages.

Feng Chen, "Multi-version Execution for the Dynamic Updating of Cloud Applications", IEEE 39th Annual International Computers, Software & Applications Conference, Sep. 9, 2015, 6 pages.

Le Yao et al., "Online Updating Soft Sensor Modeling and Industrial Application Based on Selectively Intergrated Moving Window Approach", IEEE Transactions of Instrumentation and Measurement, Mar. 23, 2017, 9 pages.

Zhang Xu, "Design and Implementation of Automatic Software Update and Upgrade Detection 23 System", Jul. 15, 2016, 1 page.

Zen Xiao-xu, "Automatic Renewal of Applying Software Edition in System of MIS", Feb. 28, 2005, 1 page.

Anshengwei, "A formal framework of event-based software dynamic update", Aug. 15, 2016, 1 page.

* cited by examiner

METHOD AND APPARATUS FOR UPDATING APPLICATION

CROSS-REFERENCE TO RELATED APPLICATIONS

This application is a US application patent, which claims priority to Chinese Application No. 201810778200.8, filed on Jul. 16, 2018. The entire disclosure of the above application is incorporated herein by reference.

FIELD

Implementations of the present disclosure generally relates to update of an application, and more particularly to a method and an apparatus for updating an application at an application trial platform, a device, and a computer readable storage medium.

BACKGROUND

With increased processing ability of a mobile terminal, there are more and more applications installed on the mobile terminal. As functions of the application become complicated, an installation package of the application is also getting bigger and bigger. A user of the mobile terminal usually needs to spend a large amount of time downloading the installation package and installing the application. When the user finds that the functions of the application cannot reach the user's expectation, the installed application may be usually removed by the user.

Presently, there are more and more application trial platforms. These application trial platforms provide a chance to try the functions of the application in advance on the application trial platforms by the user without installing the application on the user's mobile phone. An update version of the application may be usually released by a developer of the application, which requires the application trial platforms to continuously update the version of the application, to ensure that the user may use a latest application. Therefore, it is desired to provide a technical solution to update the application in a convenient and effective way.

SUMMARY

There is provided a method for updating an application. The method includes obtaining a first interface image generated during a period that a first instance of the application is running, in which, the first instance of the application is running on an application trial platform, and the application trial platform is communicatively couplable to a server of the application. In addition, the method further includes extracting a plurality of attributes associated with a control contained in the first interface image; and based on the plurality of attributes, determining whether the first interface image indicates that an update of the application is released by the serve. Furthermore, the method further includes in response to determining that the first interface image indicates that the update of the application is released by the server, updating the first instance of the application on the application trial platform.

There is provided a device. The device includes one or more processors and a storage device. The storage device is configured to store one or more programs. When the one or more programs are executed by the one or more processors, the one or more processors are configured to implement the method according to the first aspect of embodiments of the present disclosure.

There is provided a computer readable storage medium having computer programs stored thereon. When the computer programs are executed by a processor, the method according to the first aspect of embodiments of the present disclosure is implemented.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Description will be made in detail below to embodiments of the present disclosure with reference to accompanying drawings. Some implementations of embodiments of the present disclosure are illustrated in the accompanying drawings. It should be understood that, the present disclosure may be implemented in various ways, and is not limited to the implementations described herein. On the contrary, those implementations provided are merely for a thorough and complete understanding of the present disclosure. It should be understood that, the accompanying drawings and implementations of the present disclosure are merely for exemplary purposes, and is not used to limit the protection scope of the present disclosure.

In the description of implementation of the present disclosure, terms such as "include" and its equivalents should be understood as an inclusive meaning, i.e. "include but not limited to". Terms such as "based on" should be understood as "at least partially based on". Terms such as "an implementation" or "the implementation" should be understood as "at least one implementation". Terms such as "first", "second" and the like may represent different or same objects. Other explicit and implicit definitions may also be included below.

Figure 1:
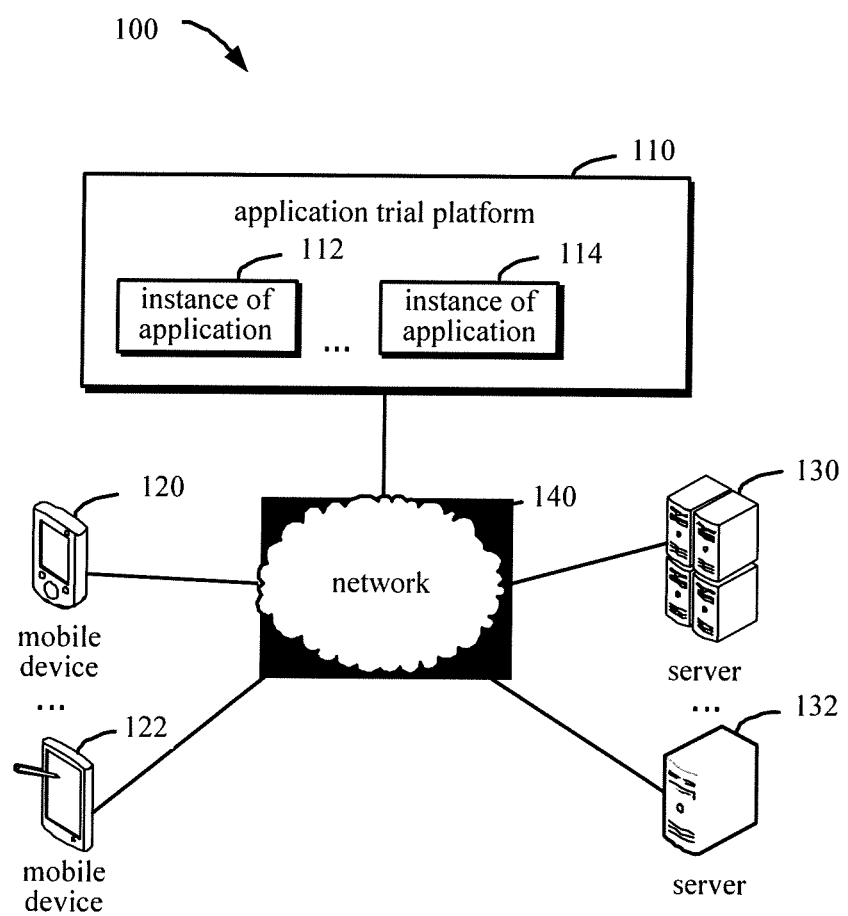
FIG. 1 is a diagram schematically illustrating an application scene in which a technical solution according to an exemplary implementation of the present disclosure may be adopted.

FIG. 1 is a diagram schematically illustrating an application scene 100 in which a technical solution according to an exemplary implementation of the present disclosure may be adopted. FIG. 1 schematically illustrates an instance of an application trial platform 110. As illustrated in FIG. 1, a plurality of instances 112, ... 114 of the application may run on the application trial platform 110. For example, the instance 112 of the application may be a game application A installed on the application trial platform 110, while the instance 114 of the application may be a game application B installed on the application trial platform 110. Although not illustrated in FIG. 1, a plurality of instances of the game application A may be running on the application trial platform 110. A frequency of updating a game application is generally high. Therefore, the game application may be taken as the instance of the application for description in context of the present disclosure. It will be understood that, in the context of the present disclosure, the application may be any other programs. For example, the application may be a program for shopping, a program for booking a ticket or a program for implementing other functions.

As illustrated in FIG. 1, the application trial platform 110 may be coupled to servers of various applications via a network 140. For example, a server 130 may be a server for the game application A, while a server 132 may be a server for the game application B. In this case, a plurality of users may try functions of each application on the application trial platform 110 through his/her mobile device 120, ... 122. In detail, one user may access the instance 112 of the application with the mobile device 120 via the network 140, and another user may access the instance 114 of the application with the mobile device 122 via the network 140.

An update version of the application may be usually released by a developer of the application, which requires the application trial platform 110 to continuously update the version of the application. A presently proposed method is to obtain a latest installation packet of the application at intervals and to determine whether to update the application by comparing versions between the installation package used by the application trial platform and the latest installation package. However, presently, the original installation package may be not modified when the application is updated. Instead, the user is prompted to download an updated installation package when the application is running (called as "hot update"). In related arts, it is unable to detect such "hot update", thereby being impossible to ensure that the version of the application on the application trial platform 110 is the latest one.

In view of the above disadvantages in the related arts, it is desired that a technical solution is provided to update the application in a convenient and effective way. Further, it is desired that the provided technical solution may be combined with an existing technical solution and may be implemented without changing hardware architecture of the existing technical solution.

According to an exemplary implementation of the present disclosure, a first interface image may be obtained. The first interface image is generated during a period that a first instance of the application is running. It is determined whether the update of the application is released by recognizing the first interface image. In the following, the description will be made in detail with reference to FIGS. 2 to 8.

Figure 2:
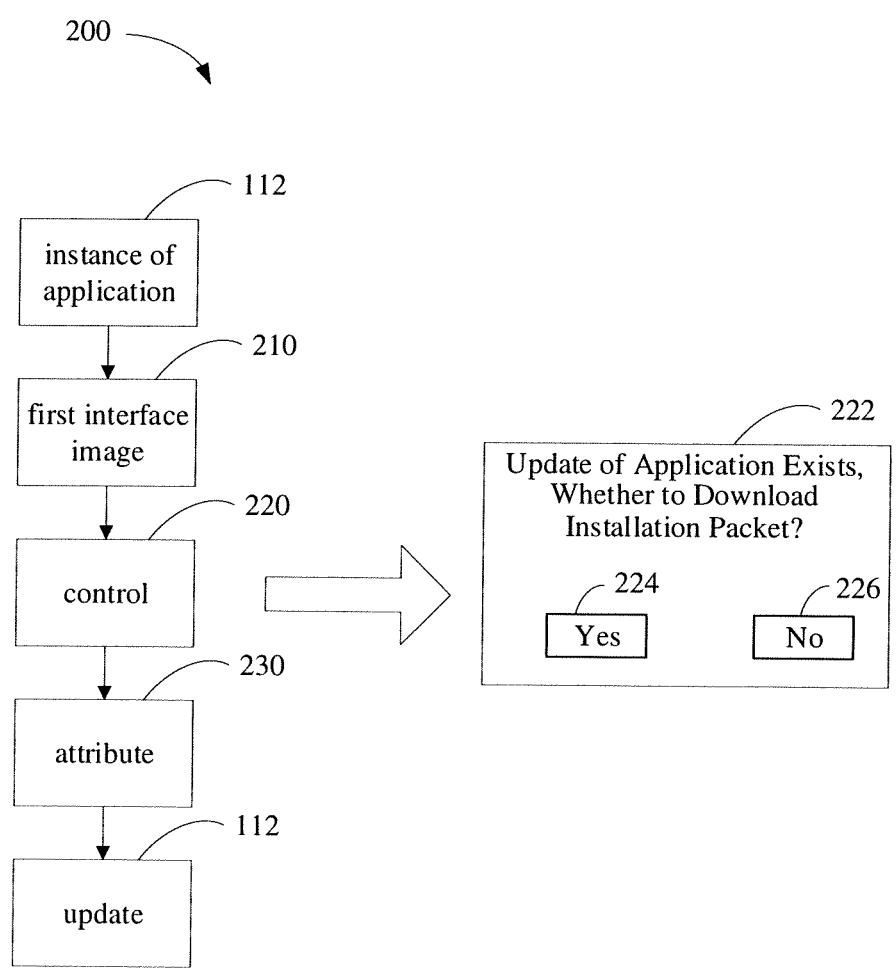
FIG. 2 is a block diagram schematically illustrating a technical solution according to an exemplary implementation of the present disclosure.

FIG. 2 is a block diagram 200 schematically illustrating a technical solution according to an exemplary implementation of the present disclosure. As illustrated in FIG. 2, the instance 112 of the application may be running on the application trial platform 110. The generated first interface image 210 may be obtained when the instance 112 of the application is running. For example, the first interface image 210 may be obtained by taking screenshots at intervals, or the first interface image 210 may be obtained when content of the screen changes.

Generally, the first interface image 210 may include a plurality of controls 220. A plurality of attributes 230 associated with the control contained in the first interface image 210 may be extracted based on the image recognition. FIG. 2 schematically illustrates a dialog box control 222 (including a key 224 and a key 226). The attributes of the control 222 may include such as character of the control, type of the control, location of the control and the like. Based on the plurality of attributes, it is determined whether the first interface image 210 indicates that an update 240 of the application is released by the server. When it is determined that the update 240 is released by the server, an installation package associated with the update 240 may be downloaded, and updating may be executed.

In above implementations, the image recognition may be performed on the first interface image of the application running on the application trial platform to extract the plurality of attributes of the control (for example, content of the character may include words "update", color may be "brightness", and so on). The update of the application may be detected based on the plurality of attributes. In this way, on one hand, the "hot update" may be detected from the first interface image 210 and updating is executed during the period that the application is running. On the other hand, detection and update may be automatically executed under the image recognition, without any manual operations.

Figure 3:
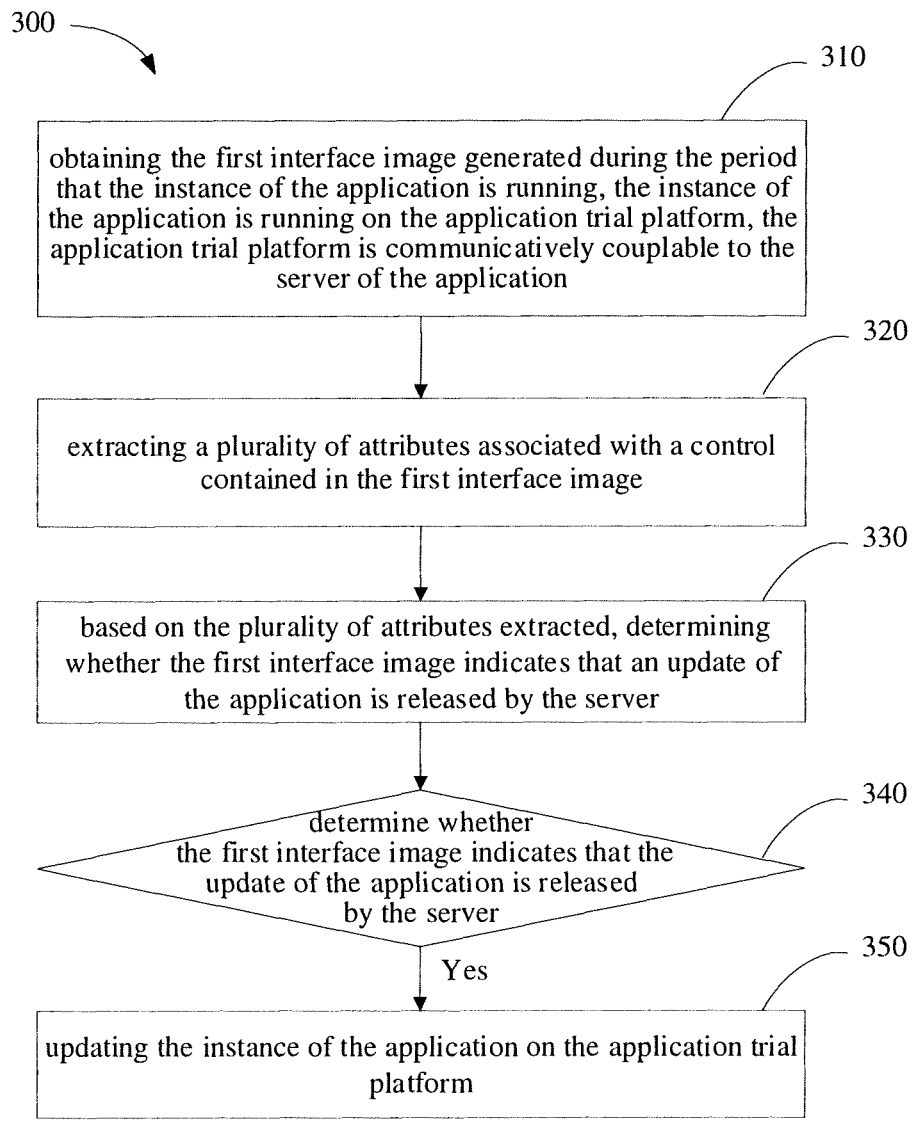
FIG. 3 is a flow chart schematically illustrating a method according to an exemplary implementation of the present disclosure.

In the following, more details related to updating the application will be described in detail with reference to FIG. 3. FIG. 3 is a flow chart schematically illustrating a method 300 according to an exemplary implementation of the present disclosure. As illustrated in FIG. 3, at block 310, the first interface image 210 generated during the period that the instance 112 of the application is running is obtained. The instance 112 of the application is running on the application trial platform 110, and the application trial platform 110 is communicatively couplable to the server 130 of the application. In the implementation, the user may remotely access the instance 112 of the application running on the application trial platform 110, rather than installing the application on his/her own mobile device 120. During the running, the instance 112 of the application may transmit an interaction between the mobile device 120 and the user from the mobile device 120 to the server 130 of the application, and receive a feedback from the server 130 of the application. The instance 112 of the application may send content displayed on an interface to the mobile device 120. For example, the instance 112 of the application may send the content to the user in a video streaming mode.

At block 320, a plurality of attributes 230 associated with the control 220 contained in the first interface image are extracted. In detail, attributes associated to a respective control may be extracted for each control contained in the first interface image 210. Generally, the control 220 may include content related to the update of the application. For example, a prompt "Update of Application Exists, Whether to Download Installation Package?" is displayed by the control 222 illustrated in FIG. 2. In this example, the attribute 230 may include, such as, characters contained in the control. According to an exemplary implementation of the present disclosure, the plurality of attributes may be extracted based on at least one of: character of the control, type of the control, location of the control, format of the control, and a decision whether the control is able to be triggered.

At block 330, based on the plurality of attributes 230 extracted, it is determined whether the first interface image 210 indicates that the update of the application is released by the server 130. For example, it may be determined that the update of the application is released based on a detected character "update" in the above characters associated with the control 222. As another example, a dialog box for prompting the update may also include characters such as "determine", "version", "new version", "download", "installation package" and the like. When it is detected that the attributes 230 associated with the control include the above characters, it is determined that the update of the application is released. It will be understood that, a case that the attributes 230 include specific characters is merely an example to describe determining whether the update of the application is released. According to an exemplary implementation of the present disclosure, the determination whether the update of the application is released may be also made based on more aspects of the attributes through a knowledge model.

At block 340, in response to determining that the first interface image 210 indicates that the update of the application is released by the server (that is, the determination result is "yes"), the block 305 may be executed. At block 305, the instance 112 of the application is updated on the application trial platform 130. For example, the key 224 contained by the control 222 illustrated in FIG. 2 may be clicked to download a related installation package and update the application, such that the instance 112 of the application is updated on the application trial platform 110.

According to an exemplary implementation of the present disclosure, the attribute 230 may include a plurality of dimensions. For example, in addition to the character of the control described above, the attribute 230 may also include one of: the type of the control, the location of the control, the format of the control, and a decision whether the control is able to be triggered. For example, the type of the control may include a dialog box, a selection box, a key and the like. The location of the control may be represented by a relative position of a center (or a top left corner) of the control on the screen. Generally, in order to cause an attention, the control for prompting the update of the application is displayed at a center of the screen. Therefore, when it is detected that the control contains the character "update" and the control is located at the center of the screen, it may be determined that the update of the application is released.

According to an exemplary implementation of the present disclosure, the attribute 230 may also include the format of the control 222 (such as, color, font, a decision whether an icon is contained, or the like). Generally, in order to cause an attention, the control 220 for prompting the update of the application may be set to have an attractive color, a big font and to include an icon such as an exclamation mark. Therefore, when it is detected that the control 220 relates to the above, it may be determined that the update of the application is released. It will be understood that, the plurality of dimensions of the attribute are described merely in an exemplary manner above. In a specific application, the attribute 230 may include more or less dimensions.

It should be understood that, under a condition where there are a plurality of attributes, when it is determined individually, based on a respective specific value of the attributes, whether each attribute satisfies a corresponding threshold that the update of the application is released, a plurality of determination statements may be used, which may result in a complex determination process. According to an exemplary implementation of the present disclosure, the feature of the control may be determined based on the plurality of attributes extracted. In this way, by mapping the plurality of attributes to a single feature, a relationship between the dimensions of the attributes related to the control and a decision whether the update of the application is released by the server may be comprehensively considered According to an exemplary implementation of the present disclosure, by using a linear regression method, the feature of the control may be determined according to the plurality of attributes. In detail, the feature of the control may be determined by employing the following equation:

$$y=\Sigma_{i=1}^{n} aiXi+bi \quad \text{Equation 1}$$

In the Equation 1, "y" represents the feature of the control, "n" represents the number of the attributes, "Xi" represents a score of an $i^{th}$ attribute of the plurality of attributes, and "ai" and "bi" respectively represent a weight of the $i^{th}$ attribute and a deviation of the $i^{th}$ attribute in the liner regression method. In this way, the plurality of attributes may be mapped to the feature in a simple and fast way, to facilitate determining whether the update of the application is released.

It is assumed that a value in a range [0,100] may represent a score of a respective attribute. For example, when there is a character such as "update", "download" or the like contained in character of the control, the score of the "character" may be set as a high value (such as, 80). Since the character is highly related to determining whether the update of the application is released, the character may be given a relatively high weight (such as, 1.5) and a position deviation. As another example, when the location of the control is the center of the screen, a score of the attribute "location" may be set as a high value (such as, 60). Since the location of the control is related to determining whether the update of the application is released, the "location" may be given a relatively high weight (such as, 1.2) and a positive deviation. With the above exemplary implementation, the feature of the control may be determined based on the score of each attribute.

According to an exemplary implementation of the present disclosure, a control knowledge model may be obtained. The control knowledge model includes a first mapping relationship between the update of the application and the feature of the control. The control knowledge model may be trained based on a group of features of sample controls and a group of updates of sample application associated with the sample controls. In response to determining that the feature of the control is matched by the first mapping relationship, it is determined that the first interface image indicates that the update of the application is released. With the above exemplary implementation, whether the update of the application is released may be determined secondarily based on a knowledge model trained using a machine learning method and existing knowledge.

Figure 4A:
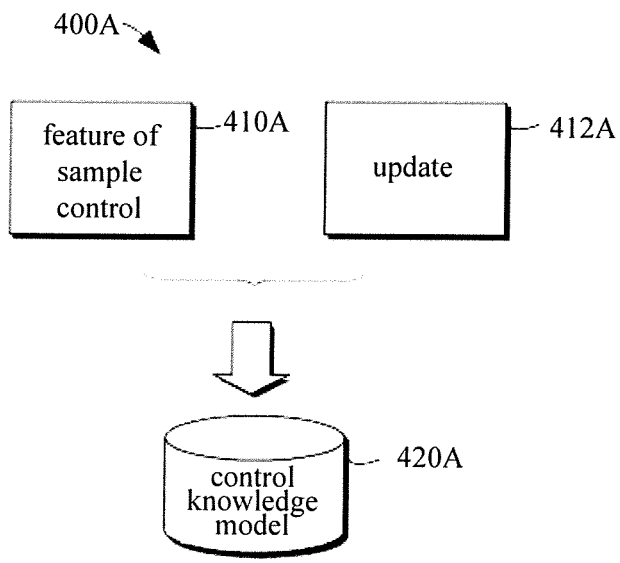
FIG. 4A is a block diagram schematically illustrating an acquisition of a control knowledge model according to an exemplary implementation of the present disclosure.

In the following, determination whether the update of the application is released based on the feature of the control may be described with reference to FIG. 4A. FIG. 4A is a block diagram 400A schematically illustrating an acquisition of a control knowledge model 420A according to an exemplary implementation of the present disclosure. As illustrated in FIG. 4A, the feature 410A of the sample control may be obtained. The feature 410A of the sample control herein is obtained during the period that the instance of the application is running previously. The update 412A refers to a decision whether the control causes the update when the instance of the application is running previously. According to an exemplary implementation of the present disclosure, the control knowledge model 420A may be trained based on the feature of the sample control 410A and the update 412A. In detail, a first group of features of sample controls (the first group of features of sample controls may cause the update) may be obtained, and a second group of features of sample controls (the second group of features of sample controls may not cause the update) may also be obtained. With the machine learning method, the control knowledge model 420A may be trained and obtained, such that it may be determined whether the update of the application is released based on the control knowledge model 420A and a currently obtained feature of the control.

According to an exemplary implementation of the present disclosure, it is assumed that the group of features of sample controls all relate to the character "update", and these controls causes the update. When the feature of the control related to the character "update" is received, it may be determined that the update of the application is released, using the above control knowledge model 420A trained based on the sample controls. With the above exemplary implementation, it may be determined whether the update of the application is released during the period that the instance 112 of the application is running, based sufficiently on the related features of the control and a historical experience determining whether the update of the application is released.

The determination whether the update of the application is released based on the feature of the control is described above. Since other complex content may be contained on the application interface, a misjudgment may occur when the determination merely depends on the feature of the control. Therefore, the determination whether the update of the application is released may be secondarily made based on entire content of the first interface image 210. According to an exemplary implementation of the present disclosure, an interface knowledge model may be obtained. The interface knowledge model includes a second mapping relationship between the update of the application and the first interface image. The interface knowledge model is trained based on a group of sample interface images and a group of updates of sample applications associated with sample interface images. Based on the second mapping relationship and the first interface image, a confidence of the update may be determined. In this implementation, when a determination result made based on the first interface image is identical with an original determination result made based on the feature of the control, it may be determined that the original determination result has a high confidence. Otherwise, the confidence of the original determination result may be reduced.

Figure 4B:
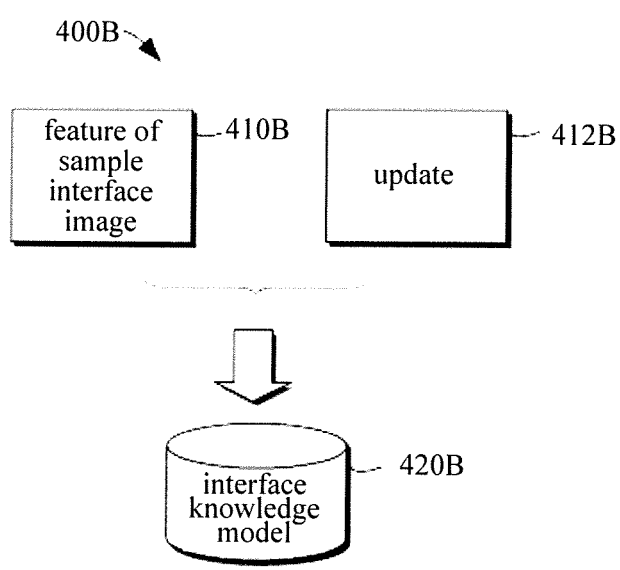
FIG. 4B is a block diagram schematically illustrating an acquisition of an interface knowledge model according to an exemplary implementation of the present disclosure.

In the following, a determination whether the update of the application is released based on the first interface image may be described with reference to FIG. 4B. FIG. 4B is a block diagram 400B schematically illustrating an acquisition of an interface knowledge model according to an exemplary implementation of the present disclosure. As illustrated in FIG. 4B, the sample interface image 410B may be obtained. The sample interface image 410B herein is obtained during the period that the instance of the application is running previously. The update 412B refers to a decision whether the first interface image 210 causes the update when the instance of the application is running previously. According to an exemplary implementation of the present disclosure, the interface knowledge model 420B may be trained based on the sample interface image 410B and the update 412B. In detail, a first group of sample interface images (the first group of sample interface images may cause the update) may be obtained, and a second group of sample interface images (the second group of sample interface images may not cause the update) may also be obtained. With the machine learning technology, the interface knowledge model 420B may be trained and obtained, such that it may be determined whether the update of the application is released based on the interface knowledge model 420B and an interface image obtained presently. Details of training and using the interface knowledge model 420B are similar to that of training and using the control knowledge model 420A illustrated in FIG. 4A, which is not elaborated in the following.

According to an exemplary implementation of the present disclosure, the control may be triggered to download, from the server, data associated with the update of the application. On the application trial platform, the first instance of the application is updated based on the data downloaded. Returning to the example illustrated in FIG. 2, it may be determined that the control 222 indicates the update of the application is released, by employing the method described above. The key 224 contained in the control 222 may be clicked, to trigger an operation downloading the installation package from the server. With the above exemplary implementation, the instance 112 of the application running on the application trial platform may be updated using a related newer installation package downloaded from the server.

Figure 5:
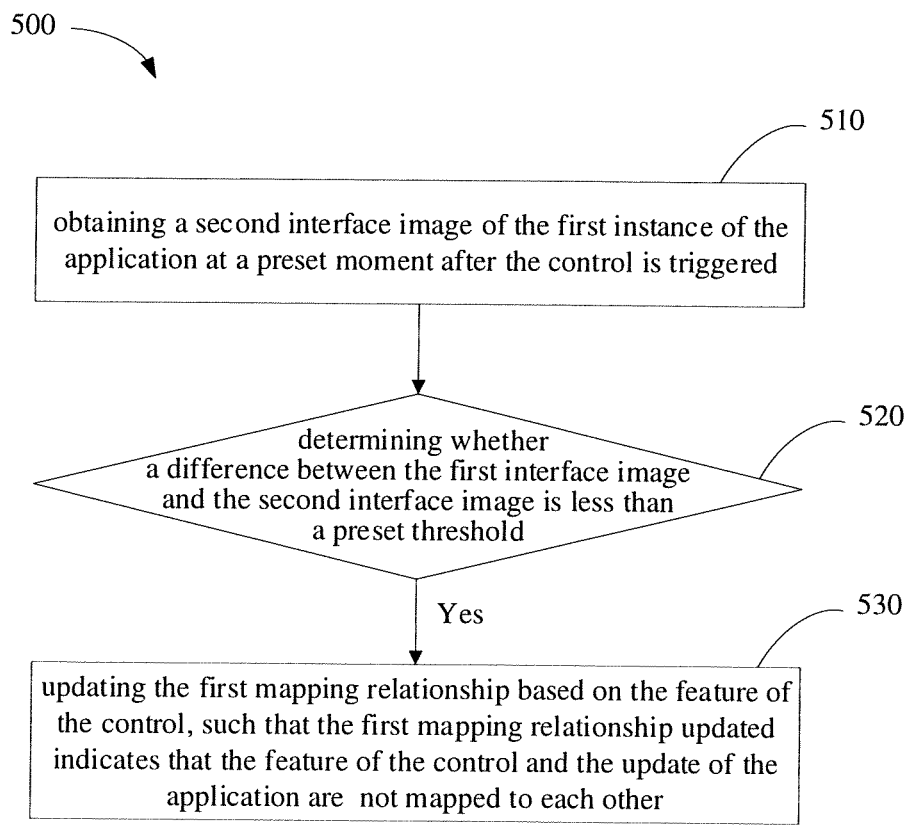
FIG. 5 is a flow chart schematically illustrating a method for updating a control knowledge model according to an exemplary implementation of the present disclosure.

According to an exemplary implementation of the present disclosure, whether the knowledge models (such as, the control knowledge model 420A and the interface knowledge model 420B) described above are accurate may be verified based on a decision whether the update of the application is caused within a subsequent period after the instance 112 of the application is running. In the following, descriptions may be made by taking the control knowledge model 420A as an example. FIG. 5 is a flow chart schematically illustrating a method 500 for updating a control knowledge model according to an exemplary implementation of the present disclosure. At block 510, a second interface image of the first instance of the application is obtained at a preset moment after the control is triggered. It will be understood that, the preset moment may be for example a time point after two minutes (or other period) from a time point when the control is triggered. Generally, when the update of the application is released, the second interface (such as, including a dialog box for prompting the user to save the installation package, or a progress bar of downloading the installation package) may be presented after the control 222 described above is triggered. It may be determined whether the update of the application is released by determining a difference between the first interface image and the second interface image.

At block 520, the difference between the first interface image and the second interface image may be determined. When the difference is less than a preset threshold, a block 530 may be executed. When the difference between the first interface image and the second interface image is less than the preset threshold, it may be represented that an operation for updating is not performed. That is, it may be considered that the control knowledge model results in a misjudgment. Therefore, at block 530, the first mapping relationship may be updated based on the feature of the control, such that the updated first mapping relationship indicates that the feature of the control and the update of the application are not mapped to each other.

According to an exemplary implementation of the present disclosure, the difference between the first interface image and the second interface image may be determined in various ways. For example, the difference may be determined by comparing pixels. As another example, the difference may be determined by recognizing characters or content contained in the two interface images. A degree of the difference may be measured by a value. For example, a preset value range of [0, 100] may be taken as a range of the difference. For example, the preset threshold may be set as 60 or others.

In an example, it is assumed that the progress bar of downloading may be displayed after the control is triggered. Therefore, it may be determined that the progress bar of downloading completely differs from the dialog box for prompting the update in the first interface image. It may be determined that an accurate determination result may be obtained based on the present knowledge models, without needing to update the knowledge models. As another example, it is assumed that the present game interface is still displayed on the second interface image after the control is triggered. As a result, it may be determined that the difference between the first interface image and the second interface image is less than the preset threshold. The control knowledge model 420A may be updated based on the feature of the control, and the interface knowledge model 420B may also be updated based on the interface image.

With the above exemplary implementation, on one hand, the control knowledge model 420A and the interface knowledge model 420B may be corrected based on a decision whether the update of the instance 112 of the application actually running is caused. On the other hand, with less samples at an initial stage of training the knowledge models, a sample causing the update of the application may be obtained when the difference between the first interface image and the second interface image is greater than the preset threshold, and a sample not causing the update of the application may be obtained when the difference between the first interface image and the second interface image is less than the preset threshold. In this way, the sample for training may be obtained based on the self-regulated learning way.

According to an exemplary implementation of the present disclosure, the method 300 described above may be executed on the application trial platform 110. According to an exemplary implementation of the present disclosure, the instance 112 of the application may receive a user input from the mobile device 120, and output the first interface image generated during the period that the first instance 112 of the application is running to the mobile device 120. The instance 112 of the application running on the application trial platform 110 may be a media between the mobile device 120 and the server 130, and configured to transmit data between the mobile device 120 and the server 130. With the above exemplary implementation, the user may experience various functions of the application without installing the application on the mobile device 120 in advance. When the user determines that the functions of the application satisfies his/her own needs, the user may download and install the application on the mobile device 120. In this way, it may be avoided that the user downloads, installs and unloads an application unsatisfying his/her own needs.

Figure 6:
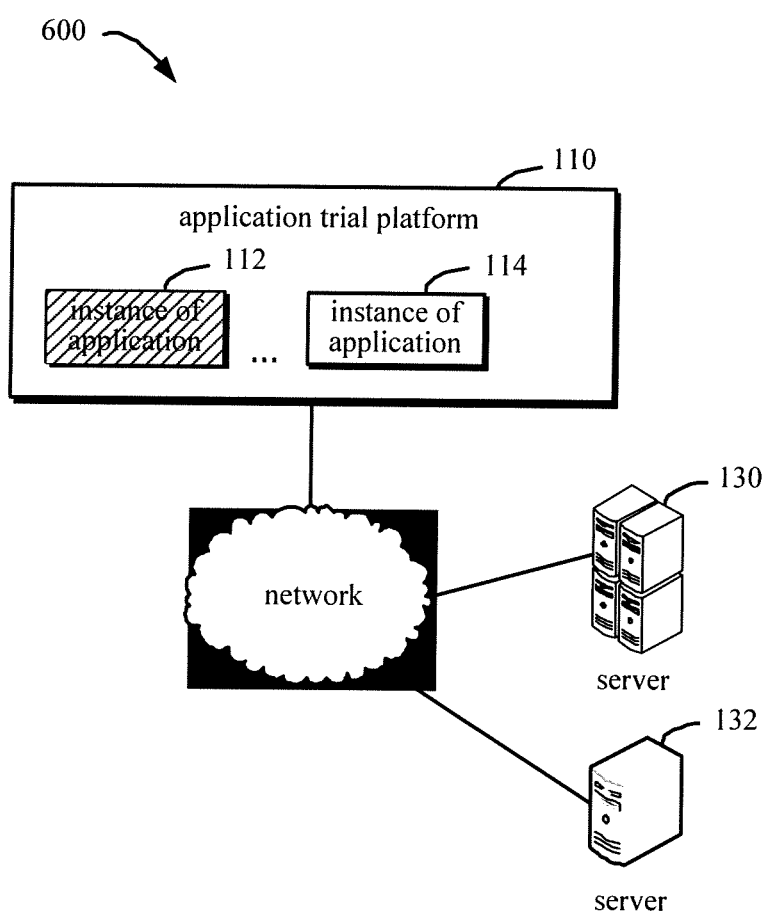
FIG. 6 is a schematic diagram schematically illustrating update of another instance of an application on an application trial platform according to an exemplary implementation of the present disclosure.

According to an exemplary implementation, the method described above may be executed for a respective instance 112 . . . 124 of the application on the application trial platform 110. According to an exemplary implementation of the present disclosure, the method described above may be executed for a part of instances, and other instances of the application running on the application trial platform 110 may be updated when it is determined that the first interface image indicates that the update of the application is released. FIG. 6 is a schematic diagram 600 schematically illustrating an update of another instance of an application on an application trial platform 110 according to an exemplary implementation of the present disclosure. As illustrated in FIG. 6, it is assumed that the above-mentioned method is executed for the instance 112 of the application running on the application trial platform 110 and it is determined that the update of the application is released. The update of the instance 114 of the application may be started. Since the instance 112 and the instance 114 are of the same application, when it is determined the update of the application is released, during the update of the instance 114, the control associated with the update of the application and contained on the interface image may be directly triggered and the operation of determining whether the update of the application is release may be skipped, such that the installation package related to the update may be downloaded and the application may be updated.

According to an exemplary implementation of the present disclosure, the method for updating an application described above may be executed within a period (such as, at night) when the application trial platform 110 has a lighter workload. In this implementation, the instance of the application may run on the application trial platform periodically, to check whether a new installation package is released by the provider of the application.

It will be understood that, the above method describes how to update the instance of the application running on the application trial platform 110 by taking that the instance 112 of the application is updated as an example. However, in an actual operation environment, there may be a plurality of instances of the application running on the application trial platform 110. The method described above may be executed for respective instance of the application. In this way, it may be ensured that each instance of each application may be updated to a newer version.

Figure 7:
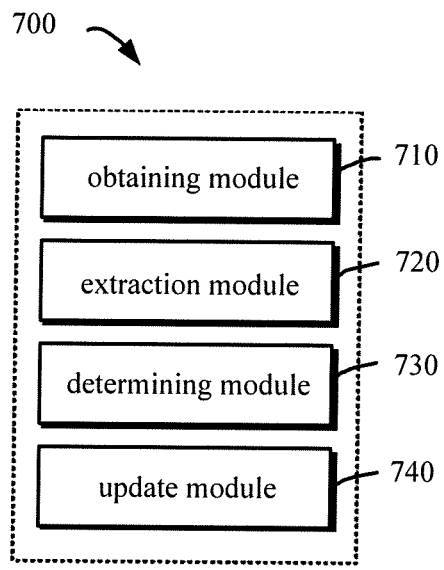
FIG. 7 is a block diagram schematically illustrating an apparatus for updating an application according to an exemplary implementation of the present disclosure.

In above, details of the method 500 for updating the instance 112 of the application running on application trial platform 110 are described with reference to drawings. According to an exemplary implementation of the present disclosure, the method described above may be executed by a processing apparatus. In detail, FIG. 7 is a block diagram schematically illustrating an apparatus 700 for updating an application according to an exemplary implementation of the present disclosure. In detail, the apparatus 700 may include: an obtaining module 710, an extraction module 720, a determining module 730 and an update module 740. In detail, the obtaining module 710 is configured to obtain a first interface image generated during a period that a first instance of the application is running. The first instance of the application is running on an application trial platform, and the application trial platform is communicatively couplable to a server of the application. The extraction module 720 is configured to extract a plurality of attributes associated with a control contained in the first interface image. The determining module 730 is configured to, based on the plurality of attributes, determine whether the first interface image indicates that an update of the application is released by the server. The update module 740 is configured to, in response to determining that the first interface image indicates that the update of the application is released by the server, update the first instance of the application on the application trial platform.

According to an exemplary implementation of the present disclosure, the determining module 730 further includes: a feature extraction module, a first model obtaining module and an update determining module. The feature extraction module is configured to determine a feature of the control based on the plurality of attributes. The first model obtaining module is configured to obtain a control knowledge model. The control knowledge model includes a first mapping relationship between the update of the application and the feature of the control, and the control knowledge mode is trained based on a group of features of sample controls and a group of updates of sample application associated with the ample controls. The update determining module is configured to, in response to determining that the feature of the control is matched by the first mapping relationship, determine that the first interface image indicates that the update of the application is released.

According to an exemplary implementation of the present disclosure, the extraction module 720 includes an attribute extraction module. The attribute extraction model is configured to extract the plurality of attributes based on at least one of: character of the control, type of the control, location of the control, format of the control, and a decision whether the control is able to be triggered.

According to an exemplary implementation of the present disclosure, the feature extraction module includes a regressing module. The regressing model is configured to, with a linear regression method, determine the feature of the control according to the plurality of attributes.

According to an exemplary implementation of the present disclosure, the apparatus 700 further includes a second model obtaining module and a verification model. The second model obtaining module is configured to obtain an interface knowledge model. The interface knowledge model includes a second mapping relationship between the update of the application and the first interface image, and the interface knowledge model is trained based on a group of sample interface images and a group of updates of sample application associated with sample interface images. The verification model is configured to, based on the second mapping relationship and the first interface image, determine a confidence of the update.

According to an exemplary implementation of the present disclosure, the update module 740 includes a triggering module and a running module. The triggering module is configured to trigger the control to download, from the server, data associated with the updating of the application. The running module is configured to, on the application trial platform, update the first instance of the application based on the data downloaded.

According to an exemplary implementation of the present disclosure, the apparatus 700 further includes an image obtaining module and a mapping update module. The image obtaining module is configured to obtain a second interface image of the first instance of the application at a preset moment after the control is triggered. The mapping update module is configured to, in response to determining that a difference between the second interface image and the first interface image is less than a present threshold, update the first mapping relationship based on the feature of the control, such that the first mapping relationship updated indicates that the feature of the control and the update of the application do not mapped to each other.

According to an exemplary implementation of the present disclosure, the apparatus 700 is disposed on the application trial platform.

According to an exemplary implementation of the present disclosure, the first instance of the application receives a user input from a mobile device and output the first interface image generated during the period that the first instance of the application is running to the mobile device.

According to an exemplary implementation of the present disclosure, the apparatus 700 further includes an instance update module. The instance update module is configured to, in response to determining that the first interface image indicates that the update of the application is released, update a second instance of the application running on the application trial platform.

Figure 8:
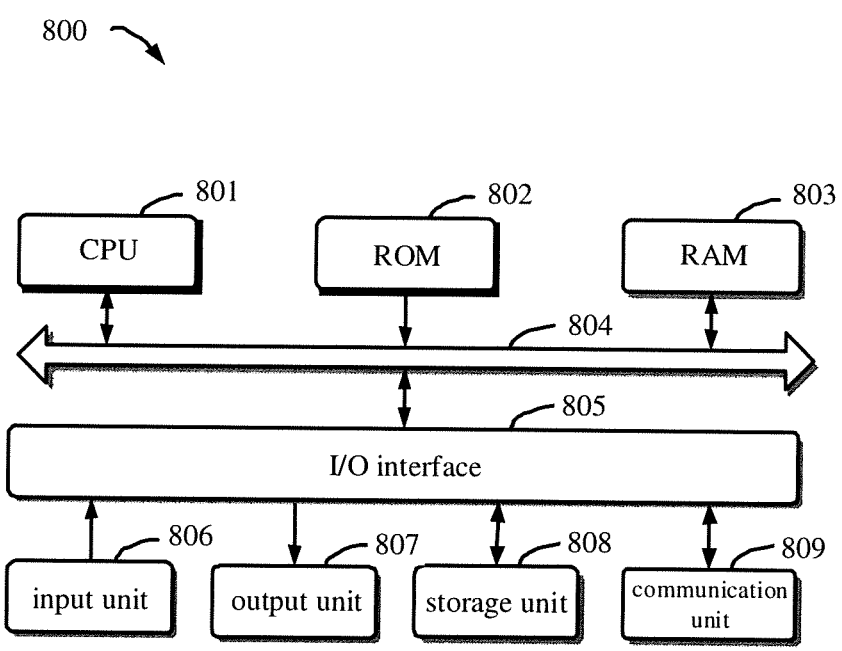
FIG. 8 is a block diagram illustrating a computing device being capable of implementing a plurality of implementations of the present disclosure.

FIG. 8 is a block diagram illustrating a computing device 800 for implementing a plurality of implementations of the present disclosure. The device 800 may be configured as the computing device 82 illustrated in FIG. 1. As illustrated in FIG. 8, the device 800 includes a center processing unit (CPU) 801. The CPU 801 may execute various appropriate actions and processes according to computer program instructions stored in a read only memory (ROM) 802 or computer program instructions loaded to a random access memory (RAM) 803 from a storage unit 808. The RAM 803 may also store various programs and date required by the device 800. The CPU 801, the ROM 802, and the RAM 803 may be connected to each other via a bus 804. An input/output (I/O) interface 805 is also connected to the bus 804.

A plurality of components in the device 800 are connected to the I/O interface 805, including: an input unit 806 such as a keyboard, a mouse; an output unit 807 such as various types of displays, loudspeakers; a storage unit 808 such as a magnetic disk, an optical disk; and a communication unit 809, such as a network card, a modem, a wireless communication transceiver. The communication unit 809 allows the device 800 to exchange information/data with other devices over a computer network such as the Internet and/or various telecommunication networks.

The processing unit 801 executes the above-mentioned methods and processes, such as the method 300. For example, in some implementations, the method 300 may be implemented as a computer software program. The computer software program is tangibly contained a machine readable medium, such as the storage unit 808. In some implementations, a part or all of the computer programs may be loaded and/or installed on the device 800 through the ROM 802 and/or the communication unit 809. When the computer programs are loaded to the RAM 803 and are executed by the CPU 801, one or more blocks of the method 300 described above may be executed. Alternatively, in other implementations, the CPU 801 may be configured to execute the method 300 in other appropriate ways (such as, by means of hardware).

According to an exemplary implementation of the present disclosure, a computer readable storage medium having computer programs stored thereon is provided. When the computer programs are executed by a processor, the method of the present disclosure is implemented.

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like.

Program codes for implementing the method of the present disclosure may be written in any combination of one or more programming languages. These program codes may be provided to a processor or a controller of a general purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although the operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific implementation details are included in the above discussion, these should not be construed as limitation of the scope of the present disclosure. Certain features described in the context of separate implementations may also be implemented in combination in a single implementation. On the contrary, various features described in the context of the single implementation may also be implemented in a plurality of implementations, either individually or in any suitable sub-combination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A method for updating an application, comprising:
   obtaining a first interface image generated during a period that a first instance of the application is running, wherein, the first instance of the application is running on an application trial platform, and the application trial platform is communicatively couplable to a server of the application;
   extracting a plurality of attributes associated with a control contained in the first interface image;
   based on the plurality of attributes, determining whether the first interface image indicates that an update of the application is released by the server; and
   in response to determining that the first interface image indicates that the update of the application is released by the server, updating the first instance of the application on the application trial platform;
   wherein, determining whether the first interface image indicates that the update of the application is released by the server comprises:
      determining a feature of the control based on the plurality of attributes;
      obtaining a control knowledge model, in which, the control knowledge model comprises a first mapping relationship between the update of the application and the feature of the control, and the control knowledge model is trained based on a group of features of sample controls and a group of updates of a sample application associated with the sample controls; and
      in response to determining that the feature of the control is matched by the first mapping relationship, determining that the first interface image indicates that the update of the application is released.

2. The method of claim 1, wherein, extracting the plurality of attributes associated with the control contained in the first interface image comprises: extracting the plurality of attributes based on at least one of:
   character of the control, type of the control, location of the control, format of the control, and a decision whether the control is able to be triggered.

3. The method of claim 1, wherein, determining the feature of the control based on the plurality of attributes comprises:
   with a linear regression method, determining the feature of the control according to the plurality of attributes.

4. The method of claim 1, further comprising:
   obtaining an interface knowledge model, in which, the interface knowledge model comprises a second mapping relationship between the update of the application and the first interface image, and the interface knowledge model is trained based on a group of sample interface images and a group of updates of sample application associated with sample interface images; and
   based on the second mapping relationship and the first interface image, determining a confidence of the update.

5. The method of claim 1, wherein, updating the first instance of the application comprises:
   triggering the control to download, from the server, data associated with the updating of the application; and
   on the application trial platform, updating the first instance of the application based on the data downloaded.

6. The method of claim 5, further comprising:
   obtaining a second interface image of the first instance of the application at a preset moment after the control is triggered; and
   in response to determining that a difference between the second interface image and the first interface image is less than a present threshold, updating the first mapping relationship based on the feature of the control, such that the first mapping relationship updated indicates that the feature of the control and the update of the application are not mapped to each other.

7. The method of claim 1, being executed on the application trial platform.

8. The method of claim 1, further comprising:
receiving, by the first instance of the application, a user input from a mobile device;
and outputting, by the first instance of the application to the mobile device, the first interface image generated during the period that the first instance of the application is running.

9. The method of claim 1, further comprising:
in response to determining that the first interface image indicates that the update of the application is released, updating a second instance of the application running on the application trial platform.

10. An electronic device, comprising:
one or more processors, and a storage device, configured to store one or more programs, wherein, when the one or more programs are executed by the one or more processors, the one or more processors are configured to
obtain a first interface image generated during a period that a first instance of the application is running, wherein, the first instance of the application is running on an application trial platform, and the application trial platform is communicatively couplable to a server of the application;
extract a plurality of attributes associated with a control contained in the first interface image;
based on the plurality of attributes, determine whether the first interface image indicates that an update of the application is released by the server; and
in response to determining that the first interface image indicates that the update of the application is released by the server, update the first instance of the application on the application trial platform;
wherein the processor is further configured to determine whether the first interface image indicates that the update of the application is released by the server by:
determining a feature of the control based on the plurality of attributes;
obtaining a control knowledge model, in which, the control knowledge model comprises a first mapping relationship between the update of the application and the feature of the control, and the control knowledge model is trained based on a group of features of sample controls and a group of updates of a sample application associated with the sample controls; and
in response to determining that the feature of the control is matched by the first mapping relationship, determining that the first interface image indicates that the update of the application is released.

11. The electronic device of claim 10, wherein the processor is further configured to extract the plurality of attributes based on at least one of:
character of the control, type of the control, location of the control, format of the control, and a decision whether the control is able to be triggered.

12. The electronic device of claim 10, wherein the processor is configured to determine the feature of the control based on the plurality of attributes by:
with a linear regression method, determining the feature of the control according to the plurality of attributes.

13. The electronic device of claim 10, wherein the processor is further configured to:
obtain an interface knowledge model, in which, the interface knowledge model comprises a second mapping relationship between the update of the application and the first interface image, and the interface knowledge model is trained based on a group of sample interface images and a group of updates of sample application associated with sample interface images; and
based on the second mapping relationship and the first interface image, determine a confidence of the update.

14. The electronic device of claim 10, wherein the processor is configured to update the first instance of the application by:
triggering the control to download, from the server, data associated with the updating of the application; and
on the application trial platform, updating the first instance of the application based on the data downloaded.

15. The electronic device of claim 14, wherein the processor is further configured to:
obtain a second interface image of the first instance of the application at a preset moment after the control is triggered; and
in response to determining that a difference between the second interface image and the first interlace image is less than a present threshold, update the first mapping relationship based on the feature of the control, such that the first mapping relationship updated indicates that the feature of the control and the update of the application are not mapped to each other.

16. The electronic device of claim 10, being disposed on an application trial platform.

17. The electronic device of claim 10, wherein the processor is further configured to:
in response to determining that the first interface image indicates that the update of the application is released, update a second instance of the application running on the application trial platform.

18. A computer readable storage medium having computer programs stored thereon, wherein, when the computer programs are executed by a processor, a method for updating an application is executed, the method comprises:
obtaining a first interface image generated during a period that a first instance of the application is running, wherein, the first instance of the application is running on an application trial platform, and the application trial platform is communicatively couplable to a server of the application;
extracting a plurality of attributes associated with a control contained in the first interface image;
based on the plurality of attributes, determining whether the first interface image indicates that an update of the application is released by the server; and
in response to determining that the first interface image indicates that the update of the application is released by the server, updating the first instance of the application on the application trial platform;
wherein, determining whether the first interface image indicates that the update of the application is released by the server comprises:
determining a feature of the control based on the plurality of attributes;
obtaining a control knowledge model, in which, the control knowledge model comprises a first mapping relationship between the update of the application and the feature of the control, and the control knowledge model is trained based on a group of features of sample controls and a group of updates of a sample application associated with the sample controls; and in response to determining that the feature of the control is matched by the first mapping relationship, determining that the first interface image indicates that the update of the application is released.

* * * * *